July 24, 1934.  K. HALLEN  1,967,306

TESTING DEVICE FOR MODULATED HIGH FREQUENCY

Filed June 16, 1932

Inventor:
Karl Hallen
by R.C. Hopgood
Attorney

Patented July 24, 1934

1,967,306

UNITED STATES PATENT OFFICE

1,967,306

TESTING DEVICE FOR MODULATED HIGH FREQUENCY

Karl Hallen, Berlin-Tempelhof, Germany, assignor to C. Lorenz Aktiengesellschaft, Berlin-Tempelhof, Germany, a company Application June 16, 1932, Serial No. 617,559
In Germany July 3, 1931

6 Claims. (Cl. 179—171)

The supervision of high frequency transmitters requires measurement of the ratio of the amplitude of the modulating frequency to the amplitude of the carrier frequency. This ratio indicates the amount or degree of modulation of the transmitter. It can be seen from this ratio to what an extent the transmitter is being utilized.

A well-known method of ascertaining the degree of modulation consists in ascertaining the peak voltages of the unmodulated and the modulated carrier frequencies and therefrom to calculate the degree of modulation. Amplifying voltmeters are employed with this method, i. e. devices that only indicate the correct value if the anode-, grid-, and filament voltages are the same as they were on calibration.

Another method makes use of the Braun tube.

Figure 1:
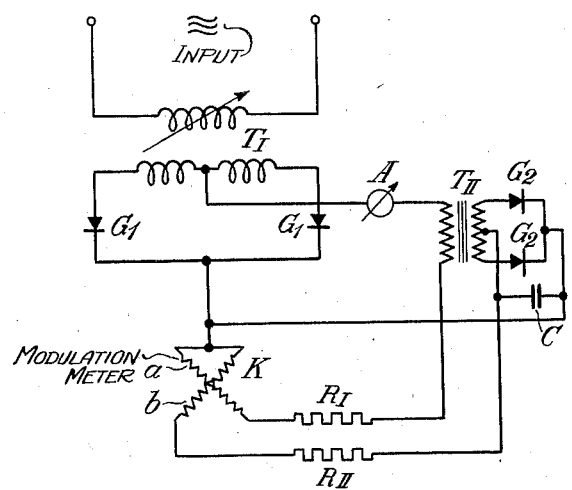
Figure 3:
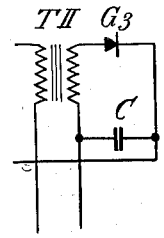
Figure 2:
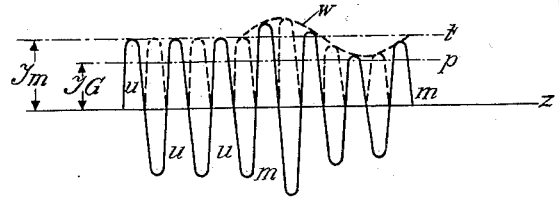

The invention described hereinafter has for its object to provide an arrangement that shall indicate the degree of modulation directly. This is obtained by means of rectifiers and a device adapted to indicate the ratio which exists between direct currents. A crossed-coil measuring instrument is adapted for this purpose, as will be understood from the following description and be particularly pointed out in the appended claims, reference being had to the accompanying drawing in which Fig. 1 shows the circuit arrangement of one embodiment of the invention. Fig. 2 is a diagram that illustrates part of the operation thereof. Fig. 3 represents a slight modification of the arrangement shown in Fig. 1.

In Fig. 1, T1 denotes a transformer coupled in a well-known manner to the transmitting antenna not shown. G1 indicates a rectifier of the two-way type, although any other rectifiers, such as thermionic valves, dry rectifiers or detector rectifiers, may be substituted instead. By $a$, $b$ the two coils of a crossed-coil measuring instrument K are denoted. RI, RII indicate resistances. TII denotes a second transformer, A an ammeter, G2 a second rectifier, C a condenser. These parts are connected in the manner shown in Fig. 1.

The transformer T1 conducts the modulated high frequency to the rectifier G1. This energy is represented in Fig. 2 by the curve $m$. The device G1 acts to rectify this energy so as to cause a direct current to flow over $a$, RI, TII, A, TI, G1. This current JG, which is the mean value of the rectified, i. e. demodulated carrier frequency, is in Fig. 2 represented by line $p$. The modulating frequency, illustrated by curve $w$, Fig. 2, is owing to such rectification superposed on this direct current or in a sense separated therefrom. It is conducted by the transformer TII to the rectifier G2. The direct current into which the modulating frequency is thus converted flows through the coil $b$ and resistance RII. Condenser C and resistance RII are so dimensioned that the time constant of the lowest frequency, i. e. about 30 cycles per second, is so trifling that it may be neglected on measuring this frequency, condenser C hence being always charged to the peak voltage so that the current flowing through resistance RII and coil $b$ is proportional to this voltage. Condenser C is also effective to by-pass any radio frequency current flowing in the secondary of transformer TII and to insure that only the frequency of the modulating current will exist in the current flowing through coil $b$ of the measuring instrument.

Line $t$ in Fig. 2 indicates the mean value Jm of the rectified modulated carrier frequency. The part $u$ of the curve shown in Fig. 2 represents the demodulated carrier frequency. The rectification of the part $u$ is illustrated by the upper halves of this part and the dotted-line halves therebetween. The expression "upper halves" means those half-waves which in the drawing are above the zero line $z$.

In order to be able to calibrate the instrument K in degrees of modulation it is necessary to provide for a definite mutual ratio of the resistances RI and RII, because the current JG that is active in the coil $a$ is smaller than the mean value Jm of the rectified modulated carrier frequency, as will be seen from Fig. 2. This is due to the fact that only this direct current JG is active in the instrument K. The current JG is to the mean value Jm as is $$1:\frac{\pi}{2}$$

This value is obtained by integrating the sine curve. If, therefore, the ratio of the resistance is such that $$RII = \frac{\pi}{2} \times RI,$$

then the degree of modulation, i. e. the ratio of the peak voltage of the modulating frequency to the mean value of the modulated carrier frequency can be read off directly at the instrument K.

It is thus of no importance whether the mean value JG of the carrier current remains constant or not, whilst in the case of two measurements such constancy is requisite. Any variations of this mean value which may occur on modulation are indicated by the ammeter A of the demodulation circuit or circuit of the rectifier G1, that is the circuit which contains the parts G1, *a*, RI, and the primary of TII.

If the transformer TI is so connected to the antenna that with non-modulation of the transmitter the deflection of the ammeter A amounts to 100 parts of the scale thereof, then if the carrier amplitude happened to vary on modulation, such variation is by the instrument A indicated in percentage values of the mean of the unmodulated wave.

The modification shown in Fig. 3 differs from the arrangement disclosed in Fig. 1 by this feature only that a single-way rectifier G3 is utilized instead of the double-way rectifier G2 represented in Fig. 1. This is useful, for instance, if the modulating frequency is not purely sinusoidal. For example, the upper amplitudes may occur to be larger than the lower ones. The rectifier G3 also in such event secures a reliable test reading. The upper or lower maximum values of the modulating oscillation may here be measured after the polarity of the primary or secondary of the transformer has been reversed.

The crossed-coil measuring instrument K may be replaced by any other device adapted for the purpose.

What is claimed is:

1. In a testing device for modulated high frequency, a rectifier, means for leading to said rectifier the modulated high frequency energy to be tested, a second rectifier, means for supplying said second rectifier with the modulating frequency from the output of said first-mentioned rectifier, an instrument adapted to indicate the mutual ratio of two direct currents, and means for conducting the rectified currents from the two said rectifiers through this instrument.

2. In a testing device for modulated high frequency, a rectifier, means for leading to said rectifier the modulated high frequency energy to be tested, a second rectifier, means for supplying said second rectifier with the modulating frequency from the output of said first-mentioned rectifier, a cross-coil instrument for indicating the mutual ratio of two direct currents, and means for conducting the rectified currents from the two said rectifiers through this instrument.

3. In a testing device for modulated high frequency, a rectifier, means for leading to said rectifier, the modulated high frequency energy to be tested, a second rectifier, means for supplying said second rectifier with the modulating frequency from the output of said first-mentioned rectifier, a crossed-coil instrument for indicating the mutual ratio of two direct currents, means for conducting the rectified currents from the two said rectifiers through this instrument, a resistance connected in series with one coil of such instrument, and a resistance connected in series with the other coil thereof, the mutual ratio of these resistances being $$1:\frac{\pi}{2}.$$

4. In a testing device for modulated high frequency, a rectifier, means for leading to said rectifier the modulated high frequency energy to be tested, a second rectifier, means for supplying said second rectifier with the modulating frequency from the output of said first-mentioned rectifier, an instrument adapted to indicate the mutual ratio of two direct currents, means for conducting the rectified currents from the two said rectifiers through this instrument, and a capacity connected in parallel with the second said rectifier.

5. In a testing device for modulated high frequency, a rectifier, means for leading to said rectifier, the modulated high frequency energy to be tested, a second rectifier, means for supplying said second rectifier with the modulating frequency from the output of said first-mentioned rectifier, an instrument adapted to indicate the mutual ratio of two direct currents, means for conducting the rectified curents from the two said rectifiers through this instrument, an ammeter, disposed in the circuit of the first said rectifier, for indicating on modulation the percentage difference between the mean value of the carrier amplitudes and the amplitude of the non-modulated frequency.

6. In a testing device for modulated high frequency, a rectifier, means for leading to said rectifier the modulated high frequency energy to be tested, a single-way rectifier, means for supplying said second rectifier with the modulating frequency from the output of said first-mentioned rectifier, an instrument adapted to indicate the mutual ratio of two direct rectified currents, and means for conducting the currents from the two said rectifiers through this instrument.

KARL HALLEN.